(12) United States Patent
Ahuja et al.

(10) Patent No.: US 11,184,248 B1
(45) Date of Patent: Nov. 23, 2021

(54) NETWORK RESOURCE ALLOCATION USING FORECASTED NETWORK TRAFFIC PATTERNS SELECTED UTILIZING NETWORK TOPOLOGY

(71) Applicant: Facebook, Inc., Menlo Park, CA (US)

(72) Inventors: Satyajeet Singh Ahuja, Saratoga, CA (US); Abishek Gopalan, San Jose, CA (US); Vinayak Dangui, Santa Clara, CA (US); Gayathrinath Nagarajan, Saratoga, CA (US); Petr V. Lapukhov, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 293 days.

(21) Appl. No.: 16/383,461

(22) Filed: Apr. 12, 2019

Related U.S. Application Data

(60) Provisional application No. 62/797,771, filed on Jan. 28, 2019.

(51) Int. Cl.
*G06F 15/173* (2006.01)
*H04L 12/24* (2006.01)
*H04L 12/891* (2013.01)

(52) U.S. Cl.
CPC ........ *H04L 41/147* (2013.01); *H04L 41/0896* (2013.01); *H04L 41/145* (2013.01); *H04L 47/41* (2013.01)

(58) Field of Classification Search
CPC . H04L 41/147; H04L 41/0896; H04L 41/145; H04L 47/41
USPC ......................................... 709/203, 223, 226
See application file for complete search history.

(56) References Cited

U.S. PATENT DOCUMENTS

| | | | |
|---|---|---|---|
| 6,771,595 B1 * | 8/2004 | Gilbert | H04L 47/10 370/229 |
| 9,432,257 B2 * | 8/2016 | Li | H04L 41/0823 |
| 2010/0150004 A1 * | 6/2010 | Duffield | H04L 41/12 370/252 |
| 2012/0157106 A1 * | 6/2012 | Wang | H04W 24/08 455/446 |

* cited by examiner

*Primary Examiner* — Duyen M Doan
(74) *Attorney, Agent, or Firm* — Van Pelt, Yi & James LLP

(57) ABSTRACT

A method and system for allocating network resources are described. The method includes receiving a plurality of forecasted network traffic patterns for a network. A representative subset of the plurality of forecasted network traffic patterns is selected based on an analysis of the plurality of forecasted network traffic patterns using a topology of the network. The selected representative subset of the plurality of forecasted network traffic patterns is used to determine a resource allocation for the network.

20 Claims, 9 Drawing Sheets

NETWORK RESOURCE ALLOCATION USING FORECASTED NETWORK TRAFFIC PATTERNS SELECTED UTILIZING NETWORK TOPOLOGY

CROSS REFERENCE TO OTHER APPLICATIONS

This application claims priority to U.S. Provisional Patent Application No. 62/797,771 entitled NETWORK PLANNING WITH DEMAND UNCERTAINTY filed Jan. 28, 2019 which is incorporated herein by reference for all purposes.

BACKGROUND OF THE INVENTION

Large networks, such as those that support social media or other applications, provide different service levels and experience large variations in traffic as well as rapid and unpredictable growth in traffic. Both short term and long term demand are subject to variations. Networks experience short term fluctuations in demand, for example due to users at different locations and different time zones accessing the network. Long term demand may be affected by events that may not be predictable. For example, the introduction of new data centers, the addition of servers to existing data centers and changes in the service architecture can increase network utilization. These events may be subject to uncertainty both in whether such events occur and the timing of occurrence. For example, the ability to secure power, space and permitting for new facilities affects the timing and ability to provide new data centers. Both short and long term demands are desired to be accommodated when producing network build plans. Further, network planning is desired to be cost-effective and accurate in the long term. Consequently, network planning presents a significant challenge. Accordingly, a mechanism that optimizes the allocation of the network resources, particularly the addition of capacity, is desired.

BRIEF DESCRIPTION OF THE DRAWINGS

Various embodiments of the invention are disclosed in the following detailed description and the accompanying drawings.

DETAILED DESCRIPTION

Figure 1:
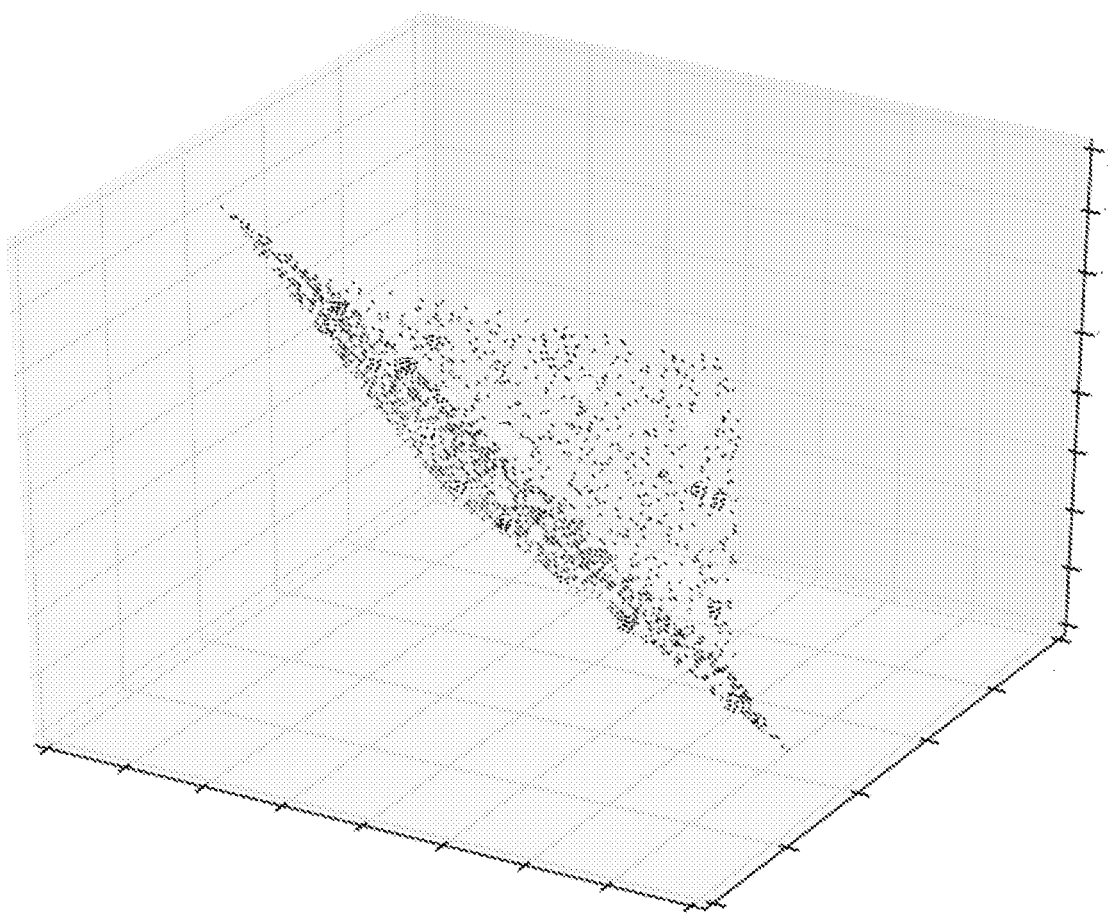
FIG. 1 is a diagram illustrating an embodiment of a number of forecasted network traffic patterns for an exemplary embodiment of a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to allocate network resources and provide a network build plan, forecasted network traffic patterns are used. A forecasted network traffic pattern represents the expected volume of traffic between all of the network endpoints. Forecasted network traffic patterns are also known as demand sets and may be represented by traffic matrices. A forecasted network traffic pattern provides a set of demands that has some nonzero likelihood of occurring in terms of aggregated traffic for the components within the network. Aggregated traffic for a node within the network is the total amount of traffic entering and leaving the node, irrespective of the source of traffic to the node and the destination for traffic leaving the node. For example, the aggregated traffic for a particular data center includes the total traffic entering the data center and the total traffic leaving the data center. Thus, the forecast aggregated inflow to and outflow are used in formulating the forecasted network traffic patterns.

Because demand is subject to fluctuations and uncertainties, these variations and uncertainties are desired to be accounted for in the forecasted network traffic patterns. To account for such uncertainties, multiple forecasted network traffic patterns are provided. Thus, a single network may have a multitude of forecasted network traffic patterns. For example, a network may have millions of forecasted network traffic patterns to account for various possible events and the times at which the events may occur.

A build plan for the network should accommodate the traffic for all of the forecasted network traffic patterns. In some embodiments, the build plan might be provided by inputting the forecasted network traffic patterns to a model, which provides a network build plan having the capacity to accommodate the traffic of the forecasted network traffic plans. Some methods use all forecasted network traffic patterns in formulating a build plan. However, providing such a large number of forecasted network traffic patterns to a model is expensive and generally untenable. Alternatively, only the forecasted network traffic pattern for the maximum demand/largest traffic might be input to the model. However, the resulting plan may not satisfy other forecasted network traffic patterns. Thus, the resulting performance of a network built with such a plan may be poor. Another method determines clusters of forecasted network traffic patterns and utilizes only a representative forecasted network traffic pattern for each cluster. However, the resulting build plan may not alter network design and may not reflect the realities of the network build. Accordingly, a mechanism for reducing the number of network traffic patterns used in formulating network build plans while maintaining confidence that the network build plan provides the requisite capacity and addresses uncertainties in demands is desired.

A method and system for allocating network resources are described. The method includes receiving a plurality of forecasted network traffic patterns for a network. A representative subset of the plurality of forecasted network traffic patterns is selected based on an analysis of the plurality of forecasted network traffic patterns using a topology of the network. The selected representative subset of the plurality of forecasted network traffic patterns is used to determine a resource allocation for the network.

FIG. 1 is a graph illustrating an embodiment of a number of forecasted network traffic patterns 100 for an exemplary embodiment of a network. Each point in the graph represents a forecasted network traffic pattern. As can be seen in FIG. 1, the total number of forecasted network traffic patterns 100 is large. The forecasted network traffic patterns 100 are desired to be used in connection with formulating a network build plan.

Figure 2:
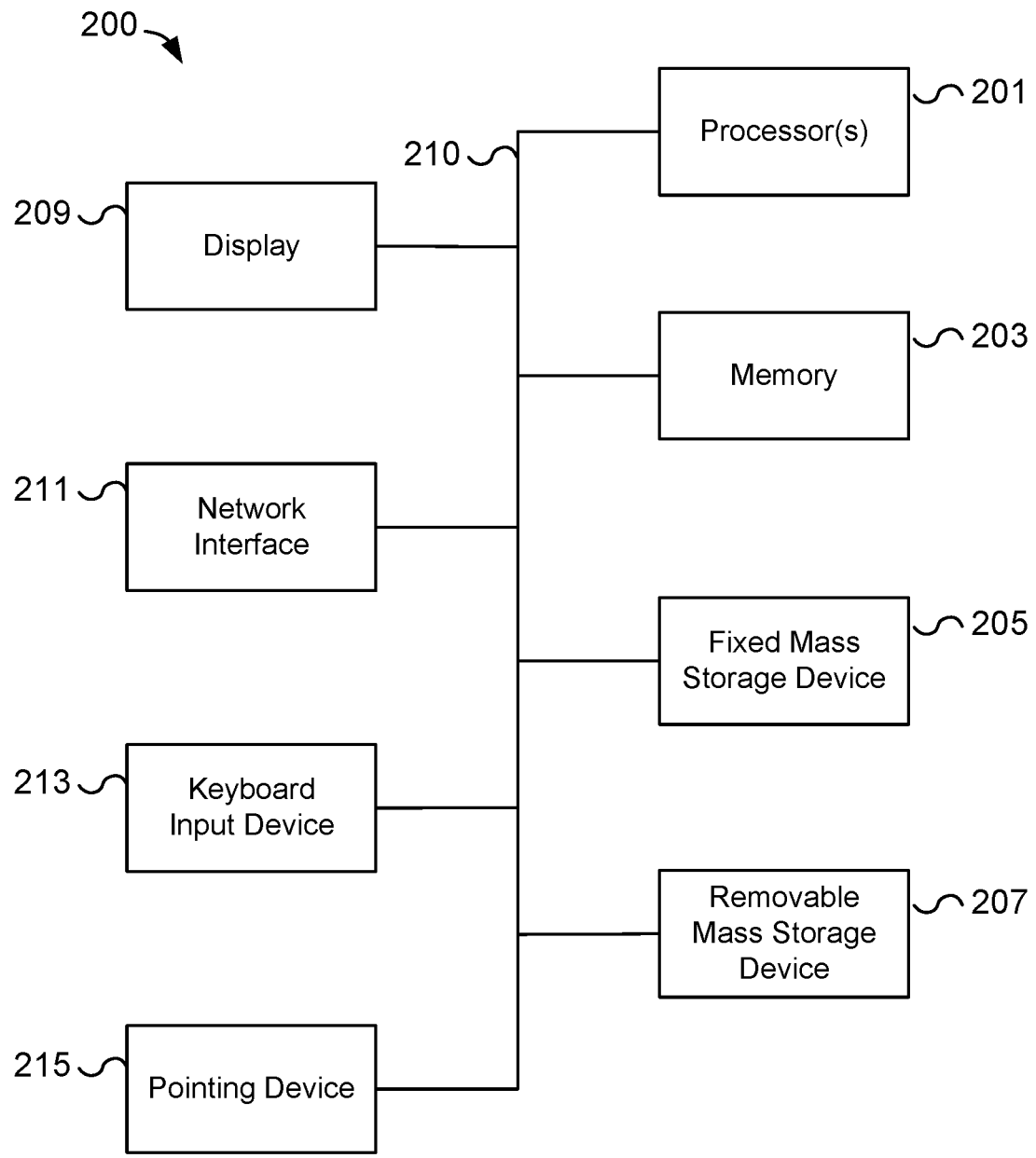
FIG. 2 is a functional diagram illustrating an exemplary embodiment of a programmed computer system usable in providing a network build plan including reducing the number of forecasted network traffic patterns used while accounting for topology of the network.

FIG. 2 is a functional diagram illustrating an exemplary embodiment of a programmed computer system 200 usable in obtaining a network build plan and reducing the number of forecasted network traffic patterns used in the network build plan while accounting for topology of the network. As will be apparent, other computer system architectures and configurations can be used to reduce the number of forecasted network traffic patterns. In some embodiments, computer system 200 is a virtualized computer system providing the functionality of a physical computer system. Computer system 200, which includes various subsystems as described below, includes at least one microprocessor subsystem (also referred to as a processor or a central processing unit (CPU)) 201. For example, processor 201 can be implemented by a single-chip processor or by multiple processors. In some embodiments, processor 201 is a general purpose digital processor that controls the operation of the computer system 200. Using instructions retrieved from memory 203, the processor 201 controls the reception and manipulation of input data, and the output and display of data on output devices (e.g., display 209). In some embodiments, processor 201 includes and/or is used to provide functionality for receiving a specification of network paths between a group of computer network routers; determining possible route paths between routers of the group of computer network routers and assigning a unique identifier to each route path of the possible route paths; determining a preferred route path of network traffic between a source computer network router and a destination computer network router among the group of computer network routers; identifying the unique identifier assigned to the preferred route path; and providing at least to routers in the preferred route path a specification of the identified unique identifier assigned to the preferred route path for the source computer network router and the destination computer network router and a specification of at least a portion of the route path that corresponds to the identified unique identifier. In some embodiments, processor 201 performs one or more of the processes described below.

Processor 201 is coupled bi-directionally with memory 203, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 201. Also as is well known in the art, primary storage typically includes basic operating instructions, program code, data, and objects used by the processor 201 to perform its functions (e.g., programmed instructions). For example, memory 203 can include any suitable computer-readable storage media, described below, depending on whether, for example, data access needs to be bi-directional or uni-directional. For example, processor 201 can also directly and very rapidly retrieve and store frequently needed data in a cache memory (not shown).

A removable mass storage device 207 provides additional data storage capacity for the computer system 200, and is coupled either bi-directionally (read/write) or uni-directionally (read only) to processor 201. For example, storage 207 can also include computer-readable media such as flash memory, portable mass storage devices, magnetic tape, PC-CARDS, holographic storage devices, and other storage devices. A fixed mass storage 205 can also, for example, provide additional data storage capacity. Common examples of mass storage 205 include flash memory, a hard disk drive, and an SSD drive. Mass storages 205, 207 generally store additional programming instructions, data, and the like that typically are not in active use by the processor 201. Mass storages 205, 207 may also be used to store user-generated content and digital media for use by computer system 200. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can also be used to provide access to other subsystems and devices. As shown, these can include a display 209, a network interface 211, a keyboard input device 213, and pointing device 215, as well as an auxiliary input/output device interface, a sound card, speakers, additional pointing devices, and other subsystems as needed. For example, the pointing device 215 can be a mouse, stylus, track ball, or tablet, and is useful for interacting with a graphical user interface.

The network interface 211 allows processor 201 to be coupled to another computer, computer network, or telecommunications network using one or more network connections as shown. For example, through the network interface 211, the processor 201 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 211.

An auxiliary I/O device interface (not shown) can be used in conjunction with computer system 200. The auxiliary I/O device interface can include general and customized interfaces that allow the processor 201 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional, fewer, and/or different subsystems. In addition, bus 210 is illustrative of any interconnection scheme serving to link the subsystems. Other computer architectures having different configurations of subsystems can also be utilized.

Figure 3:
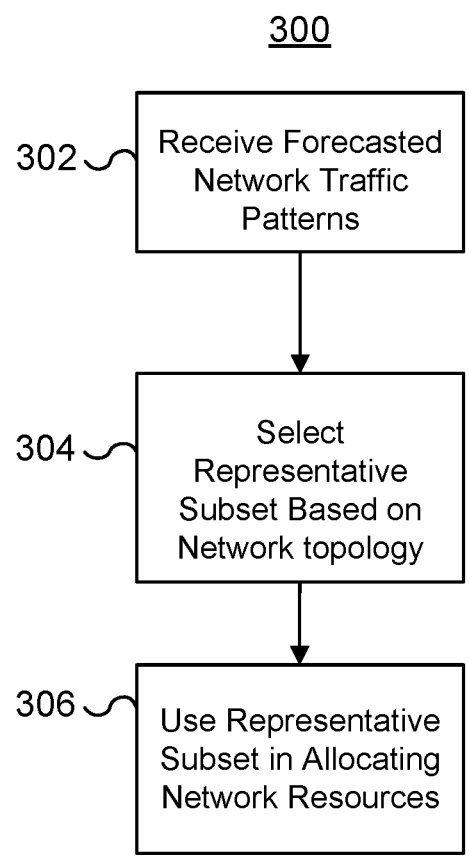
FIG. 3 is a flow chart depicting an exemplary embodiment of process for reducing the number of forecasted network traffic patterns and using representative network traffic patterns in formulating a network build plan.

FIG. 3 is a flow chart depicting an exemplary embodiment of process 300 for reducing the number of forecasted network traffic patterns and using representative network traffic patterns in formulating a network build plan. In some embodiments, the process of FIG. 3 is performed by computer system 200 of FIG. 2.

Forecasted network traffic patterns for a network are received, at 302. For example, the forecasted network traffic patterns 100 depicted in FIG. 1 may be received at 302. As can be seen in FIG. 1, the number of points and thus the number of forecasted network traffic patterns 100 provided is very large. Thus, the number of network traffic patterns 100 is desired to be reduced without sacrificing the ability to create network build plans based on the network traffic patterns, while maintaining confidence that the network build plan provides the requisite capacity and addresses uncertainties in demands. In some embodiments, the forecasted network traffic patterns 100 provided at 302 include aggregated traffic for the network, as described above.

A representative subset of the forecasted network traffic patterns is selected, at 304. This selection is made based on an analysis of the forecasted network traffic patterns provided at 302 and using the topology of the network. In some embodiments, the Layer 1/physical topology is used in the analysis performed at 304. The forecasted network traffic pattern(s) selected for the representative subset at 304 include those forecasted network traffic patterns that may require in additional capacity in the network to be serviced. A forecasted network traffic pattern that can already be served with existing hardware in the network is generally of less interest in the network build plan because such traffic can be met without adding capacity to the network. Thus, changes to the existing physical topology of the network may be made to satisfy the demands of members of the representative subset. In addition, the forecasted network traffic patterns that are in the representative subset are desired to be non-dominated. Non-dominated forecasted network traffic patterns are those for which the network having sufficient capacity to meet the demands results in demands for similar forecasted network traffic patterns also being met by the network.

Figure 4:
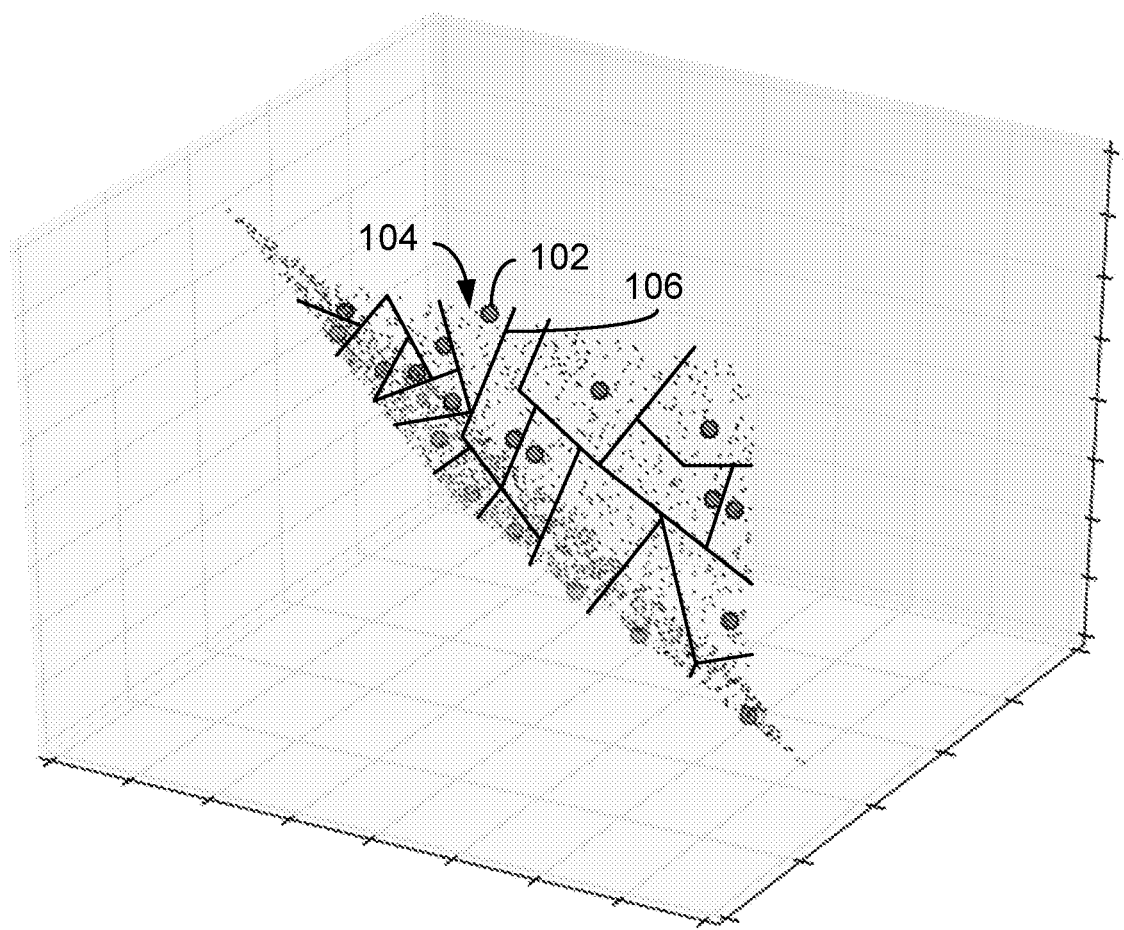
FIG. 4 is a diagram illustrating an embodiment of a number of forecasted network traffic patterns including members of representative subsets for an exemplary embodiment of a network.

For example, FIG. 4 depicts forecasted network traffic patterns 100A. The forecasted network traffic patterns 100A are the same as those depicted in FIG. 1. The forecasted network traffic patterns 100A include members of the representative subset. These members of the representative subset are indicated by large circles. For simplicity only one member 102 of the representative subset is labeled. As discussed above, each member of the represented subset dominates other forecasted network traffic patterns and has been selected based on the topology of the network. Thus, the forecasted network traffic patterns 100A have been divided by boundaries, of which one boundary 106 is labeled. Boundaries 106 divide the forecasted network demands 100A into partitions 104. Each partition 104 includes a member 102 of the representative subset and the forecasted network traffic patterns that are dominated by the member 102.

The representative subset selected at 304 is used to determine resource allocation for the network, at 306. In some embodiments, only the members 102 of the representative subset are input to the model that provides the network build plan. The resulting network build plan may then be utilized in allocating physical resources for the network. Because fewer forecasted network traffic patterns (only members of the representative subset) are input to the model, use of the model may be facilitated. Because members of the representative subset dominate other forecasted network traffic patterns, the resulting network build plan should account for traffic not only of the representative subset, but also dominated forecasted network traffic patterns. As a result, the network build plan should be capable of serving the demands of all forecasted network traffic plans. Further, the topology of the network has been accounted for in formulating the network build plan. Thus, an accurate network build plan that accounts for uncertainties as well as the topology of the network may be more easily provided.

Figure 5:
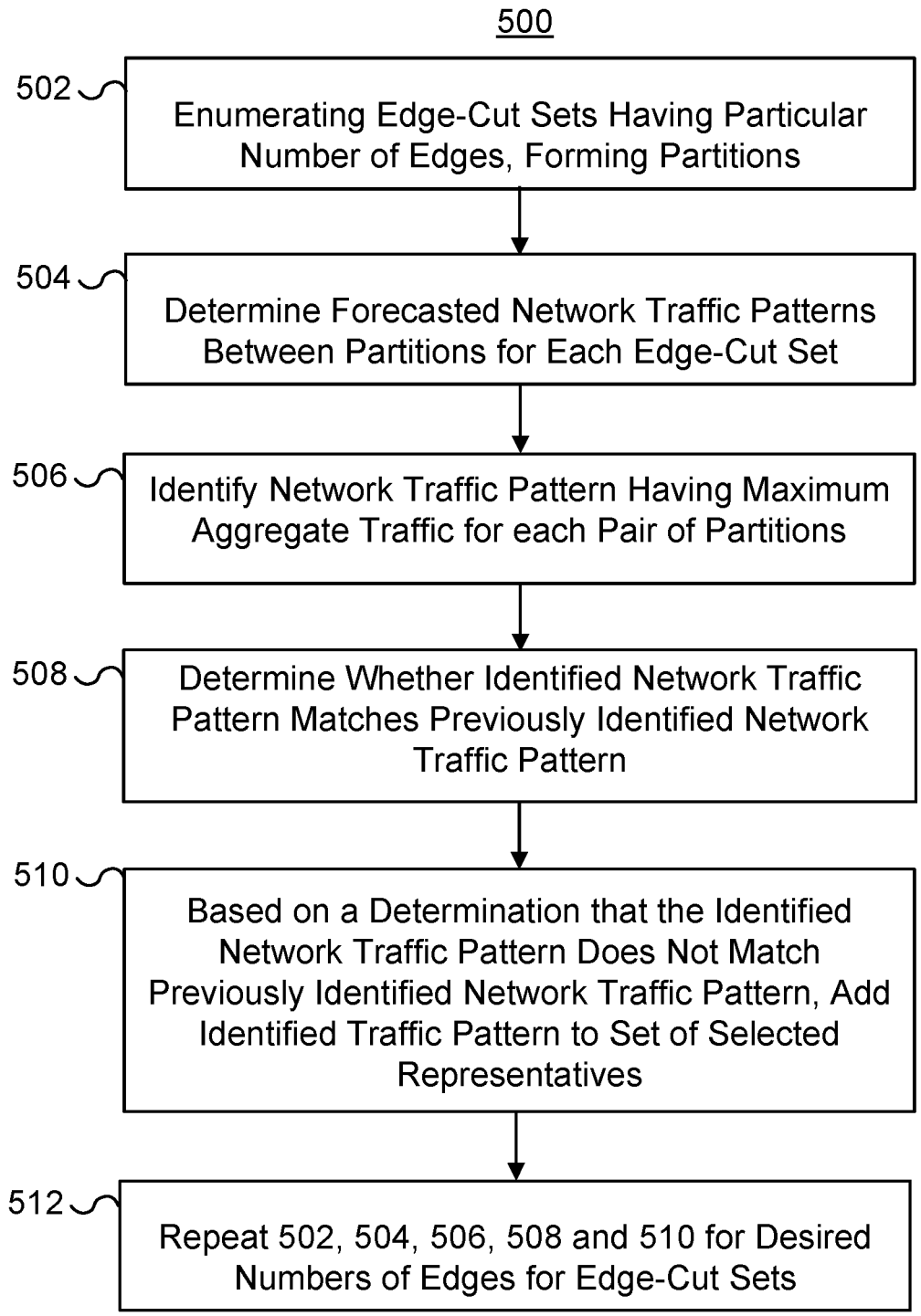
FIG. 5 is a flow chart depicting an exemplary embodiment of process for selecting a representative subset of forecasted network traffic patterns.

FIG. 5 is a flow chart depicting another exemplary embodiment of process 500 for selecting members of the representative subset, described above. In some embodiments, the process of FIG. 5 is performed by computer system 200 of FIG. 2. Thus, method 500 is utilized on forecasted network traffic patterns that have been provided. The resultant of method 500 is the non-dominated forecasted network traffic patterns that are likely to result in additional capacity added to the network.

A plurality of edge-cut sets for the topology of the physical network is enumerated, at 502. Each of the edge-cut sets has a particular number, k, of edges. The edge-cut sets separate the topology of network into partitions. Each of the partitions includes greater than one (e.g. at least two) connected network components and is separable from the remaining portion of the network. For the edge-cut sets, k is an integer of at least two through n (e.g. 2, 3, 4, 5, . . . n). The maximum value of k (i.e., n) is selected such that the probability of finding an edge-cut set for n is sufficiently low. In practice, n may generally be 4 or 5. However, lower or higher values of n may be used for some embodiments. In some embodiments, on a first iteration of method 500, k is 2. The value of k may then be incremented on subsequent iterations.

A portion of the plurality of forecasted network traffic patterns for the network that correspond to the partitions for the k edge-cut sets is determined, at 504. These forecasted network traffic patterns represent aggregated traffic between the partition(s). At 504, therefore, aggregated traffic between the partitions for each of the edge-cut sets having k edges is determined. If more than two partitions exist for the edge-cut sets having k edges, then 504 is determined for each pair of partitions (e.g. aggregated traffic across a boundary).

A particular forecasted network traffic pattern having a maximum aggregated traffic between each pair of partitions is identified, at 506. This forecasted network traffic pattern is the non-dominated network traffic pattern for the partitions. In some embodiments, different partitions or different forecast network traffic patterns are weighted. In such embodiments, if multiple forecasted network traffic patterns have the same maximum aggregated traffic, then a forecasted network traffic pattern having a higher weight is identified at 506.

It may be determined whether the forecasted network traffic pattern having the maximum aggregated traffic matches a previously identified forecasted network traffic pattern, at 508. A match is identified if the maximum traffic across the edge/between the pair of partitions is the same or within a threshold. If there is a match, then one of the identified forecasted network traffic patterns is discarded. If instead it is determined that there is no match, then the forecasted network traffic pattern identified at 506 is added to the representative subset for the forecasted network traffic patterns, at 510. In some embodiments, 508 may be omitted. In such an embodiment, the representative subset may contain more members, some of which are substantially duplicative.

The enumerating the edge-cut sets at 502, determining the portion of the forecasted network traffic patterns at 504, determining the particular forecasted network traffic pattern for having the maximum traffic for each partition pair at 506 as well as 508 (optionally), and 510, are repeated for different values of k, at 512. Thus, edge-cut sets having two, three, four up through n edges are provided and the corresponding members of the representative subset determined. Thus, the number of forecasted network traffic patterns can be reduced for use in, for example, building out a network.

In densely connected portions of a network, small-sized edge-cut sets may not partition the network. In such networks, large edge-cut sets may not be highly probable. In such embodiments, the topology of the network may be viewed as a mix of an aggregated and non-aggregated portion. In such embodiments, method 500 is used for the non-aggregated portion of the network. Thus, using method 500 non-dominated forecasted network traffic patterns that may result in a build out of additional capacity may be identified for the network based on the underlying topology.

Figure 6A:
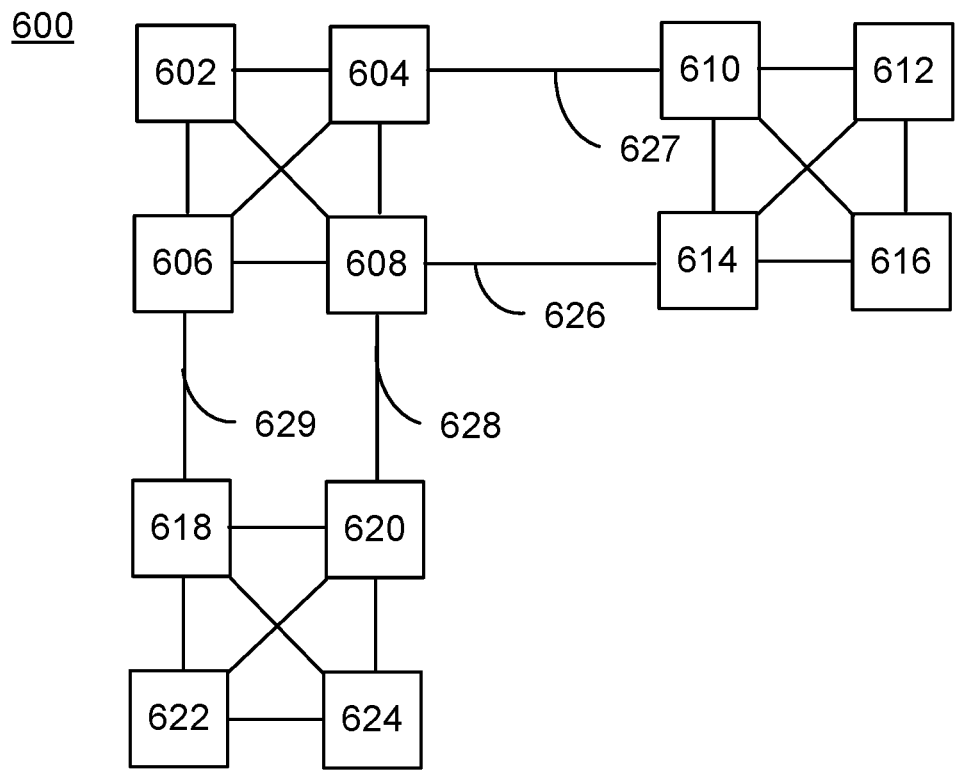
FIGS. 6A-6H are diagrams depicting embodiments of a network during a method for selecting a representative subset of forecasted network traffic patterns.

Thus, using method 500, the non-dominated members of the representative subset may be selected. For example, FIGS. 6A-6H are diagrams depicting embodiments of a network 600 during method 500 for selecting a representative subset of forecasted network traffic patterns. Network 600 is a greatly simplified for clarity. As can be seen in FIG. 6A, network 600 includes nodes 602, 604, 606, 608, 610, 612, 614, 616, 618, 620, 622 and 624 connected by links, of which only links 626, 627, 628 and 629 are labeled for simplicity. Network 600 thus can be seen as a Layer 1 fiber graph.

Figure 6B:
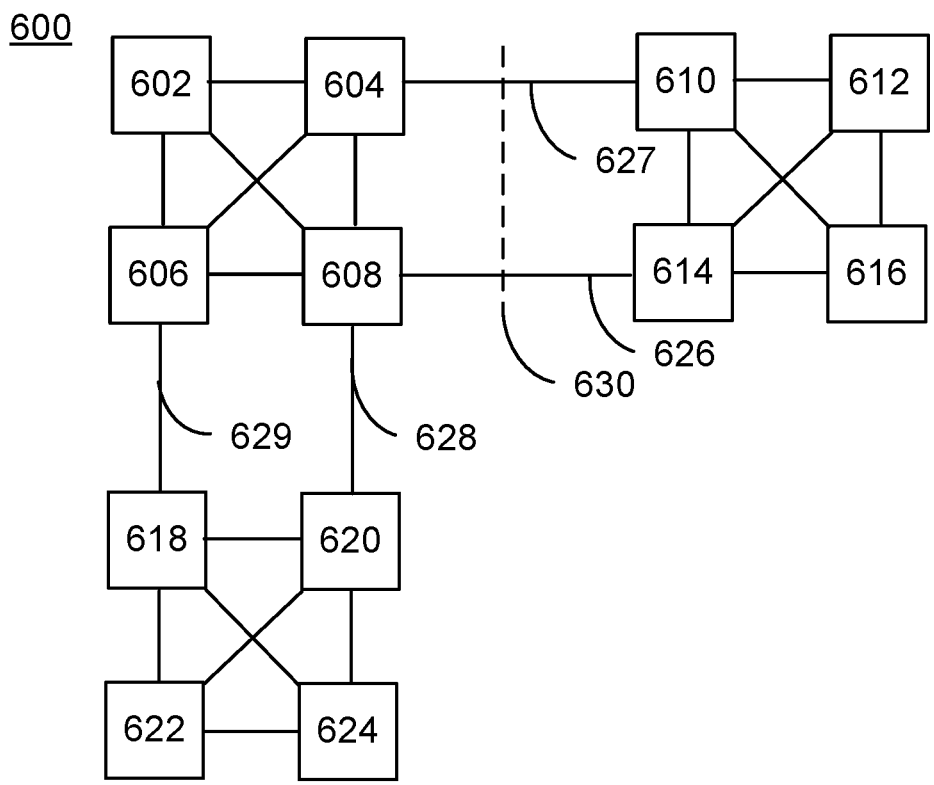
Figure 6C:
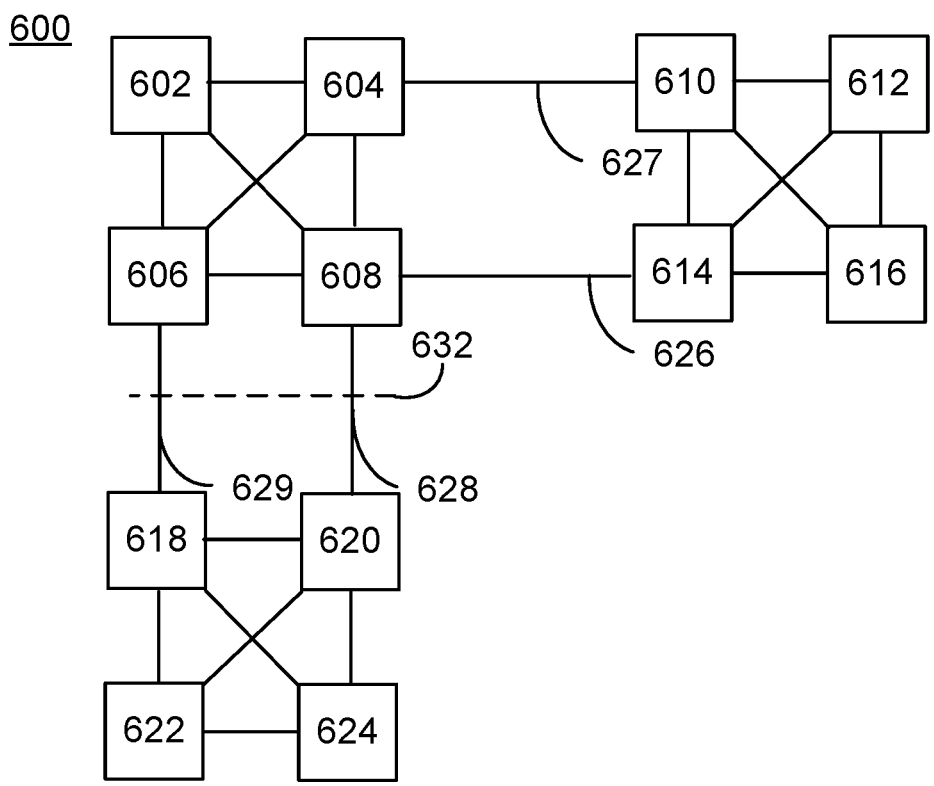
Figure 6D:
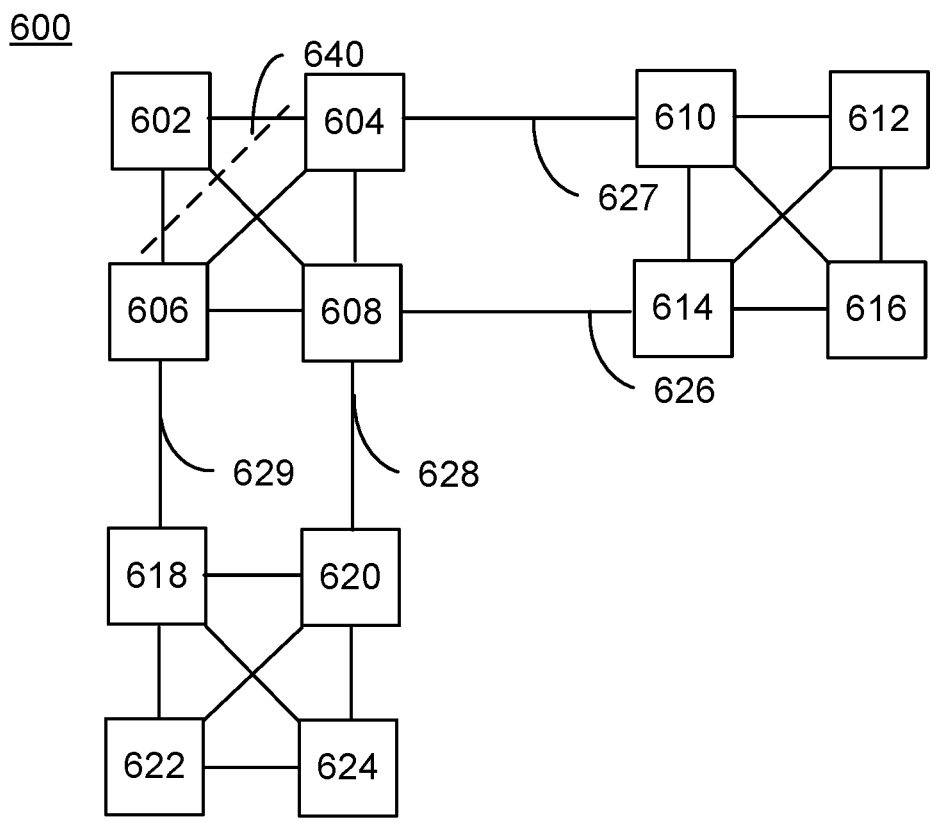
Figure 6E:
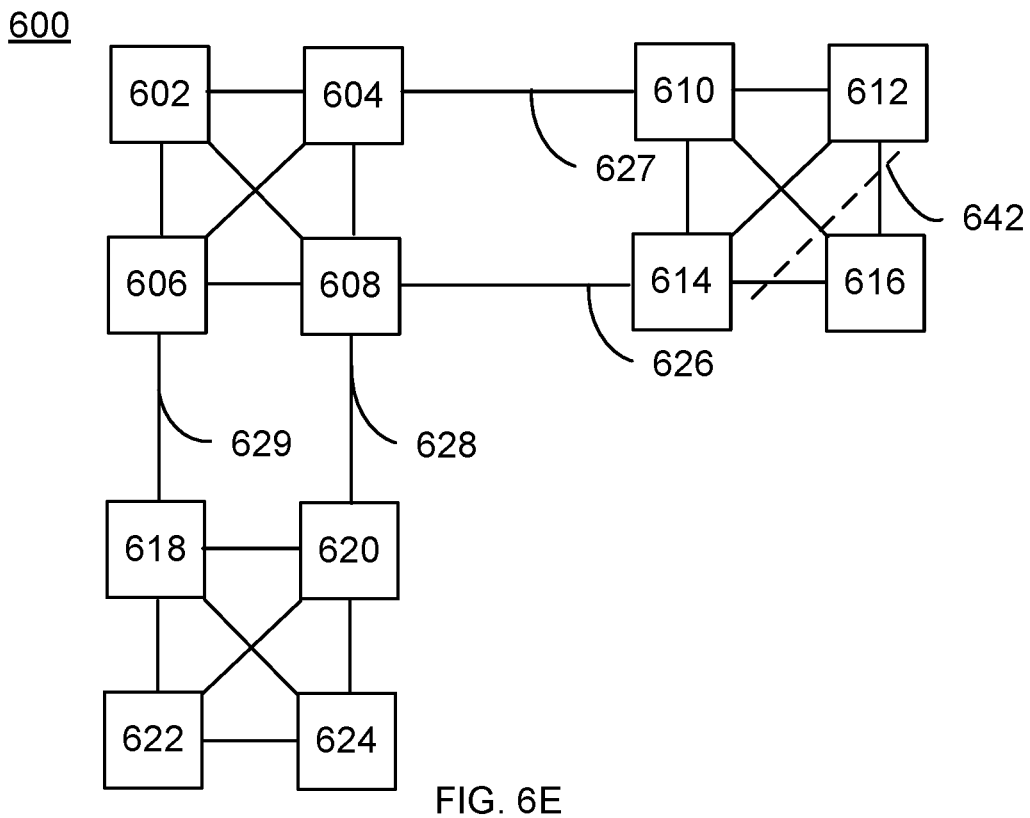
Figure 6F:
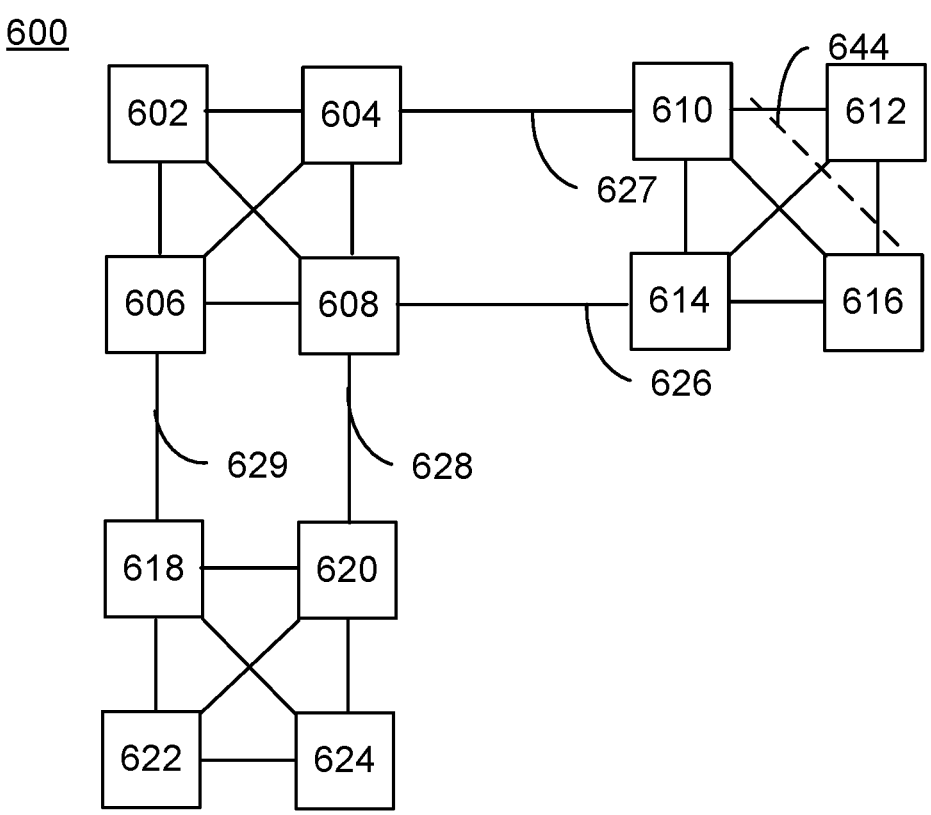
Figure 6G:
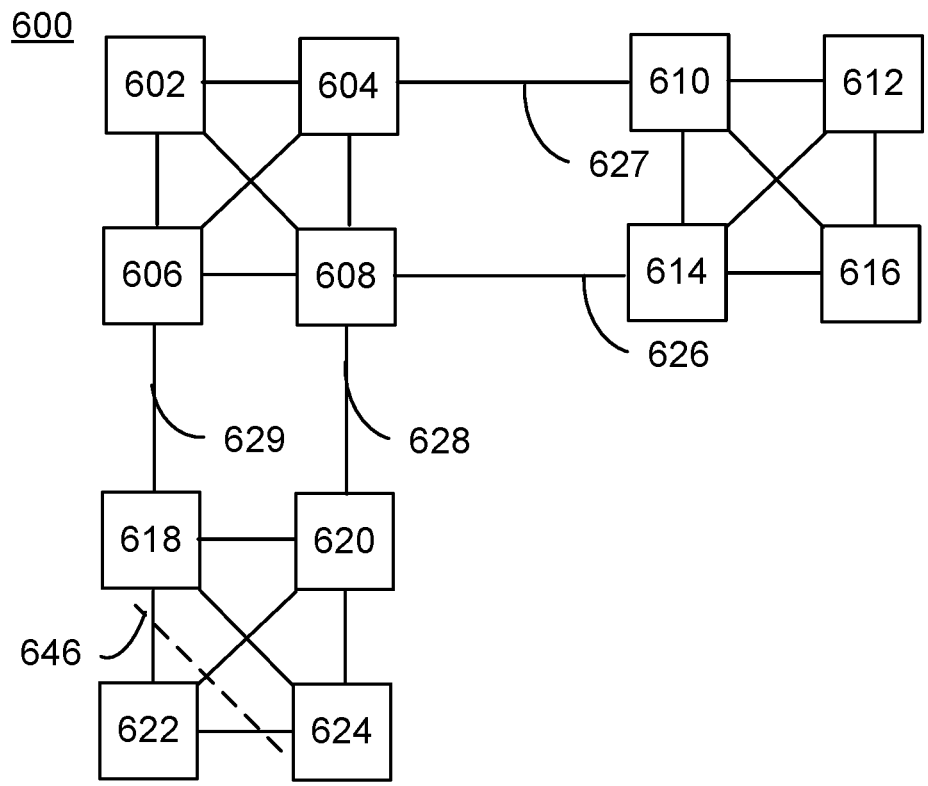
Figure 6H:
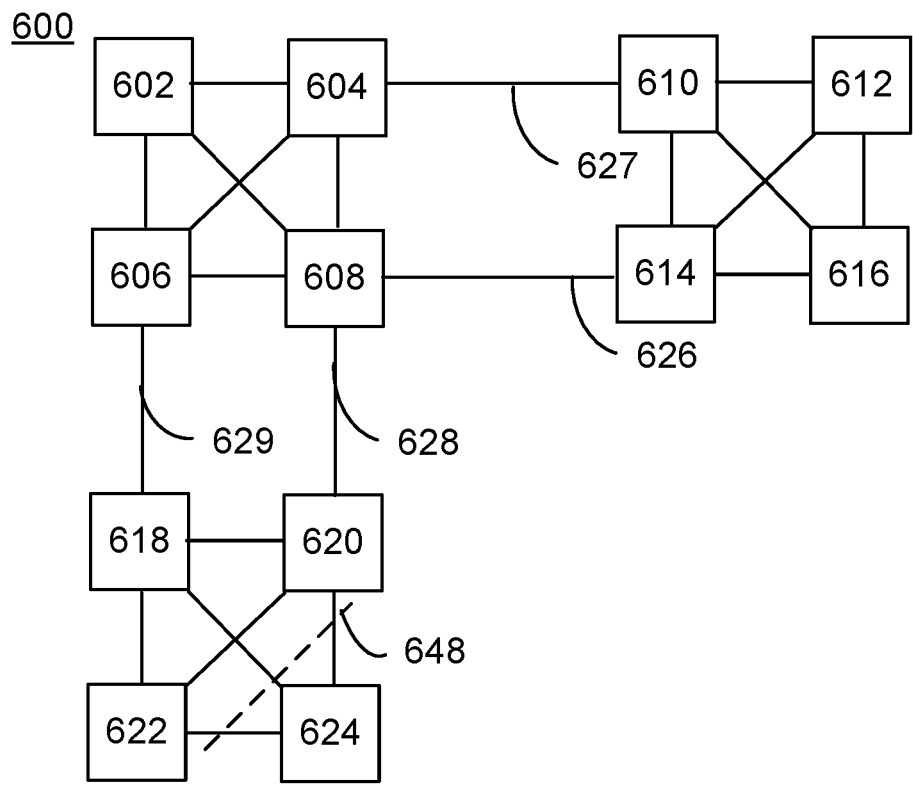

At 502, the edge-cut sets for k=2 are enumerated, forming partitions. These partitions are shown in FIGS. 6B and 6C. One cut, boundary 630 is through links (or edges) 626 and 627 of FIG. 6B. Another boundary 632 is through links 628 and 629 is shown in FIG. 6C. Thus, the k=2 edge-cuts form a total of three partitions. Traffic is considered across pairs of partitions at 504. As can be seen in FIG. 6B one partition includes nodes 610, 612, 614 and 616, while the other partition includes nodes 602, 604, 606, 608, 618, 620, 622 and 624. Traffic between these partitions flows through links 626 and 627 across boundary 630. Suppose two forecasted network traffic patterns between the partitions are determined at 504. A first forecasted network traffic pattern indicates that aggregated traffic of 10 (in the appropriate units) flows across link 627 and 5 flows across link 626. A second forecasted network traffic pattern indicates that aggregated traffic of 3 flows across link 627 and 7 flows across link 626. The first forecasted network traffic pattern having a higher maximum aggregated traffic flow of 12 is identified at 506. At 510, this first forecasted network traffic pattern is added to the representative subset of forecasted network traffic patterns.

FIG. 6C has one partition that includes nodes 602, 604, 606, 608, 610, 612, 614 and 616, while the other partition includes nodes 618, 620, 622 and 624. Traffic between these partitions flows through links 628 and 629 across boundary 632. Suppose two more forecasted network traffic patterns between the partitions are determined at 504. A first forecasted network traffic pattern indicates that aggregated traffic of 4 (in the appropriate units) flows across link 628 and 5 flows across link 629. A second forecasted network traffic pattern indicates that aggregated traffic of 6 flows across link 628 and 3 flows across link 629. The second forecasted network traffic pattern also has a higher weight, for example because is it more likely to occur. The second forecasted network traffic pattern is considered to have a higher maximum aggregated traffic flow of 9 because of the higher weight. Thus, the second forecasted network traffic pattern is identified at 506 as a candidate for inclusion in the representative subset. At 508, it may be determined whether the aggregated traffic flow (9) matches the aggregated traffic flow (12) of the member of the representative subset, at 508. At 510, this second forecasted network traffic pattern is added to the representative subset of forecasted network traffic patterns.

At 512, steps 502, 504, 506, 508 and 510 are repeated for k=3. FIGS. 6D, 6E, 6F, 6G and 6H indicate the three edge-cuts sets that are formed for cuts/boundaries 640, 642, 644, 646 and 648. Although partitions in FIGS. 6D, 6E, 6F, 6G and 6H indicate nodes 602, 616, 612, 622 and 624 form partitions, nodes 602, 612, 616, 622 and 624 are considered to include multiple connected components. For example, nodes 602, 612, 616, 622 and 624 may each correspond to a data center. As such, at least two connected network components are present in each partition in FIGS. 6D-6H. A similar procedure as described above would be followed to determine contributions to the representative subset for forecasted network traffic patterns related to k=3 edge-cut sets. Corresponding forecasted traffic patterns having the maximum traffic across the boundaries 640, 642, 644, 646 and 648 may be selected as members of the representative subset. The method may be repeated for higher values of k but are not shown for simplicity.

Using method 500, a very large number of forecasted network traffic patterns may be reduced significantly to the representative subset. Method 500 thus provides a relatively fast and simple mechanism to provide a manageable number of forecasted network traffic patterns. The representative subset also includes those forecasted network traffic patterns likely to require additional capacity/additional network resource allocation. This representative subset of forecasted network traffic patterns may then be used in formulating a network build plan. Thus, a more cost effective and accurate network build plans may be provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a plurality of forecasted network traffic patterns for a network;
    selecting a representative subset of the plurality of forecasted network traffic patterns based on an analysis of the plurality of forecasted network traffic patterns using a topology of the network, selecting the representative subset further including
    selecting a plurality of non-dominated forecasted network traffic patterns from the plurality of forecasted network traffic patterns; and
    using the selected representative subset of the plurality of forecasted network traffic patterns to determine a resource allocation for the network.

2. The method of claim 1, wherein the plurality of non-dominated forecasted network traffic patterns correspond to additional capacity for the network.

3. The method of claim 1, wherein the selecting the representative subset further includes:
    enumerating a plurality of edge-cut sets for the topology of the network, each of the plurality of edge-cut sets including a particular number of edges and separating the topology into a plurality of partitions, each of the plurality of partitions including greater than one network component;
    determining a portion of the plurality of forecasted network traffic patterns for aggregated traffic between the plurality of partitions for each of the plurality of edge-cut sets; and
    determining a particular forecasted network traffic pattern having a maximum
    aggregated traffic between the plurality of partitions.

4. The method of claim 3 wherein the selecting the representative subset further includes:
    repeating the enumerating the plurality of edge-cut sets, determining the portion of the plurality of forecasted network traffic patterns, and determining the particular forecasted network traffic pattern for another number of edges.

5. The method of claim 3 wherein the selecting the representative subset further includes:
    determining whether the maximum aggregated traffic for the particular forecasted network traffic pattern matches a previously selected maximum aggregated traffic for a previously selected forecasted network traffic pattern; and
    based on a determination that the maximum aggregated traffic does not match the previously selected maximum aggregated traffic, selecting the particular forecasted network traffic pattern as a member of the selected representative subset of the forecasted network traffic pattern.

6. The method of claim 5 wherein the selecting the representative subset further includes:
    repeating the enumerating the plurality of edge-cut sets, determining the portion of the plurality of forecasted network traffic patterns, determining the particular forecasted network traffic pattern, determining whether the maximum aggregated traffic matches the previously selected maximum aggregated traffic and selecting the particular forecasted network traffic pattern as a member of the selected representative subset for another number of edges.

7. A system for allocating network resources, comprising:
    a processor configured to:
        receive a plurality of forecasted network traffic patterns for a network;
        select a representative subset of the plurality of forecasted network traffic patterns based on an analysis of the plurality of forecasted network traffic patterns using a topology of the network, the processor being configured to select the representative subset further including the processor being configured to
            select a plurality of non-dominated forecasted network traffic patterns from the plurality of forecasted network traffic patterns; and
        use the selected representative subset of the plurality of forecasted network traffic patterns to determine a resource allocation for the network; and
    a memory coupled to the processor and configured to provide the processor with instructions.

8. The system of claim 7, wherein the plurality of non-dominated forecasted network traffic patterns correspond to additional capacity for the network.

9. The system of claim 7 wherein to selecting the representative subset the processor is further configured to:
    enumerate a plurality of edge-cut sets for the topology of the network, each of the plurality of edge-cut sets including a particular number of edges and separating the topology into a plurality of partitions, each of the plurality of partitions including greater than one network component;
    determine a portion of the plurality of forecasted network traffic patterns for aggregated traffic between the plurality of partitions for each of the plurality of edge-cut sets; and
    determine a particular forecasted network traffic pattern having a maximum aggregated traffic between the plurality of partitions.

10. The system of claim 9 wherein to select the representative subset the processor is further configured to:
    repeat the enumerating the plurality of edge-cut sets, determining the portion of the plurality of forecasted network traffic patterns, and determining the particular forecasted network traffic pattern for another number of edges.

11. The system of claim 9 wherein to select the representative subset the processor is further configured to:

determine whether the maximum aggregated traffic for the particular forecasted network traffic pattern matches a previously selected maximum aggregated traffic for a previously selected forecasted network traffic pattern; and select the particular forecasted network traffic pattern as a member of the selected representative subset of the forecasted network traffic pattern based on a determination that the maximum aggregated traffic does not match the previously selected maximum aggregated traffic.

12. The system of claim 11 wherein to select the representative subset the processor further configured to:

repeat the enumerating the plurality of edge-cut sets, determining the portion of the plurality of forecasted network traffic patterns, determining the particular forecasted network traffic pattern, determining whether the maximum aggregated traffic matches the previously selected maximum aggregated traffic and selecting the particular forecasted network traffic pattern as a member of the selected representative subset for another number of edges.

13. A computer program product for allocating network resource, the computer program product being embodied in a non-transitory computer readable storage medium and comprising computer instructions for:

receiving a plurality of forecasted network traffic patterns for a network;

selecting a representative subset of the plurality of forecasted network traffic patterns based on an analysis of the plurality of forecasted network traffic patterns using a topology of the network, the selecting the representative subset further including selecting a plurality of non-dominated forecasted network traffic patterns from the plurality of forecasted network traffic patterns; and using the selected representative subset of the plurality of forecasted network traffic patterns to determine a resource allocation for the network.

14. The computer program product of claim 13, wherein the plurality of non-dominated forecasted network traffic patterns correspond to additional capacity for the network.

15. The computer program product of claim 13 wherein the instructions for selecting the representative subset further include instructions for:

enumerating a plurality of edge-cut sets for the topology of the network, each of the plurality of edge-cut sets including a particular number of edges and separating the topology into a plurality of partitions, each of the plurality of partitions including greater than one network component;

determining a portion of the plurality of forecasted network traffic patterns for aggregated traffic between the plurality of partitions for each of the plurality of edge-cut sets; and determining a particular forecasted network traffic pattern having a maximum aggregated traffic between the plurality of partitions.

16. The computer program product of claim 15 wherein the instructions for selecting the representative subset further include instructions for:

determining whether the maximum aggregated traffic for the particular forecasted network traffic pattern matches a previously selected maximum aggregated traffic for a previously selected forecasted network traffic pattern; and based on a determination that the maximum aggregated traffic does not match the previously selected maximum aggregated traffic, selecting the particular forecasted network traffic pattern as a member of the selected representative subset of the forecasted network traffic pattern.

17. The computer program product of claim 16 wherein the instructions for selecting the representative subset further include instructions for:

repeating the enumerating the plurality of edge-cut sets, determining the portion of the plurality of forecasted network traffic patterns, determining the particular forecasted network traffic pattern, determining whether the maximum aggregated traffic matches the previously selected maximum aggregated traffic and selecting the particular forecasted network traffic pattern as a member of the selected representative subset for another number of edges.

18. The method of claim 1, wherein the network having sufficient capacity to meet first demands of a non-dominated forecasted network traffic pattern of the plurality of non-dominated forecasted network traffic patterns corresponds to the network being capable of meeting second demands for at least one other forecasted network traffic pattern of the plurality of forecasted network traffic patterns that corresponds to the non-dominated forecasted network traffic pattern.

19. The system of claim 7, wherein the network having sufficient capacity to meet first demands of a non-dominated forecasted network traffic pattern of the plurality of non-dominated forecasted network traffic patterns corresponds to the network being capable of meeting second demands for at least one other forecasted network traffic pattern of the plurality of forecasted network traffic patterns that corresponds to the non-dominated forecasted network traffic pattern.

20. The computer program product of claim 13, wherein the network having sufficient capacity to meet first demands of a non-dominated forecasted network traffic pattern of the plurality of non-dominated forecasted network traffic patterns corresponds to the network being capable of meeting second demands for at least one other forecasted network traffic pattern of the plurality of forecasted network traffic patterns that corresponds to the non-dominated forecasted network traffic pattern.

* * * * *